Sept. 13, 1960     J. W. WINZELER ET AL     2,952,794
ARC LAMP
Filed Oct. 3, 1957     8 Sheets-Sheet 1
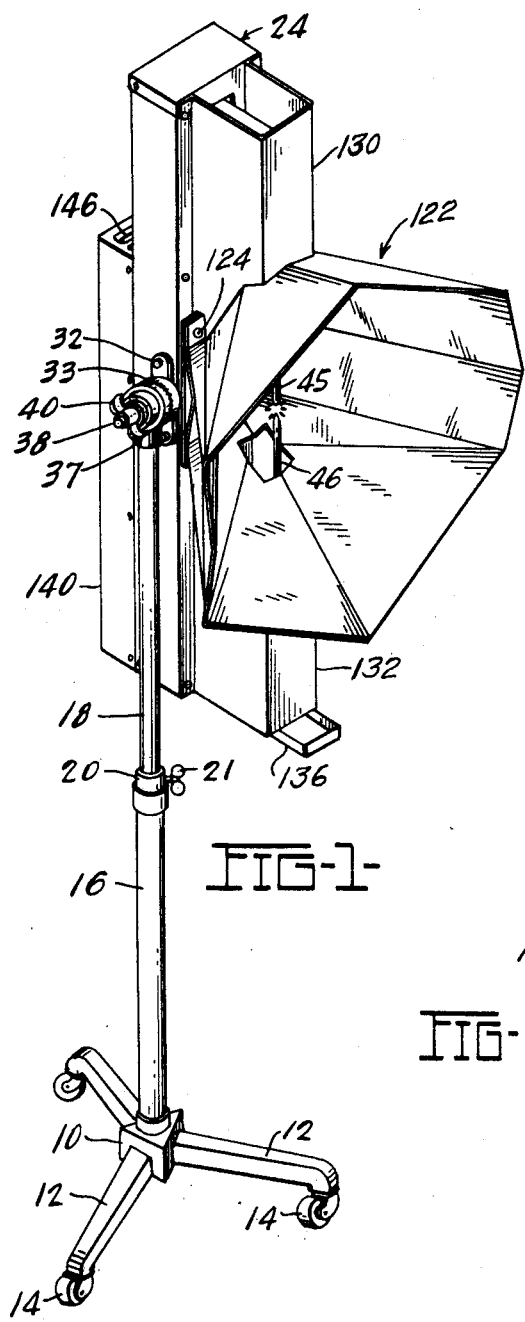
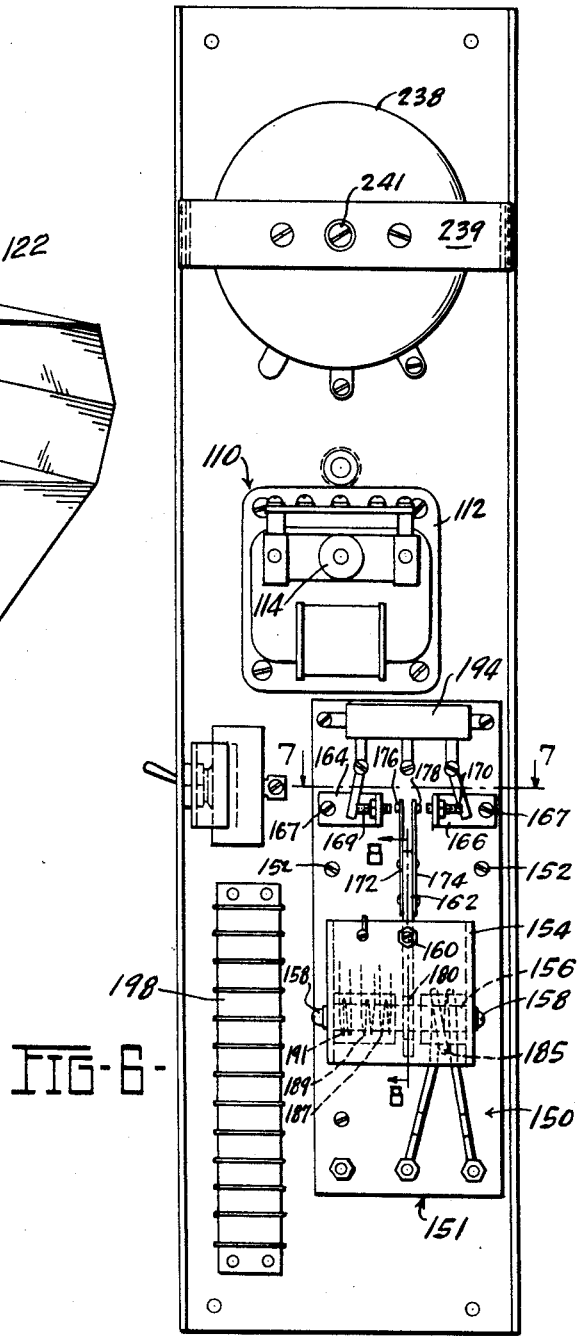
Inventors:
JOHN W. WINZELER.
ARTHUR J. HATCH.
BY Harry O. Erneberger
ATTY.

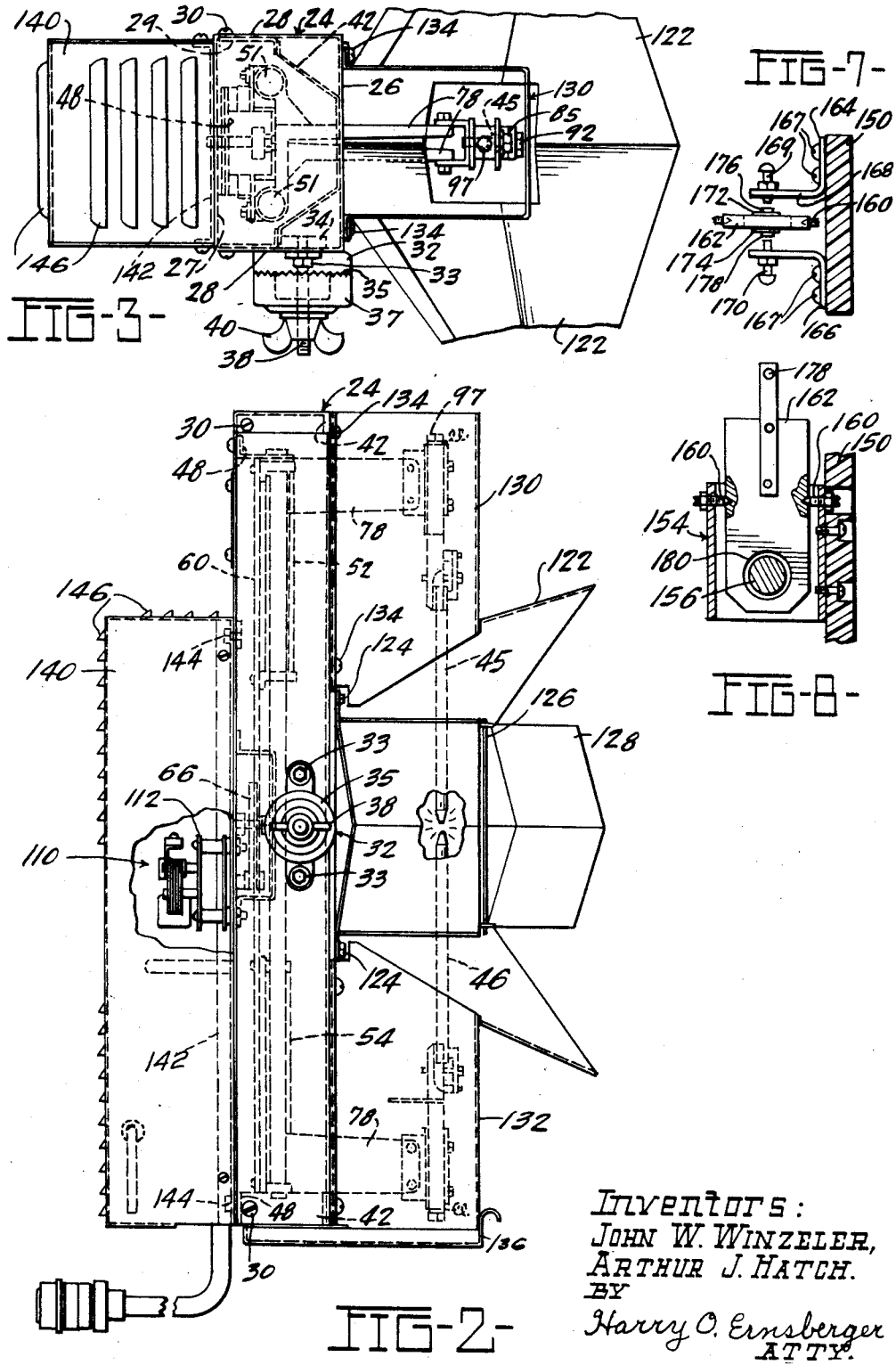

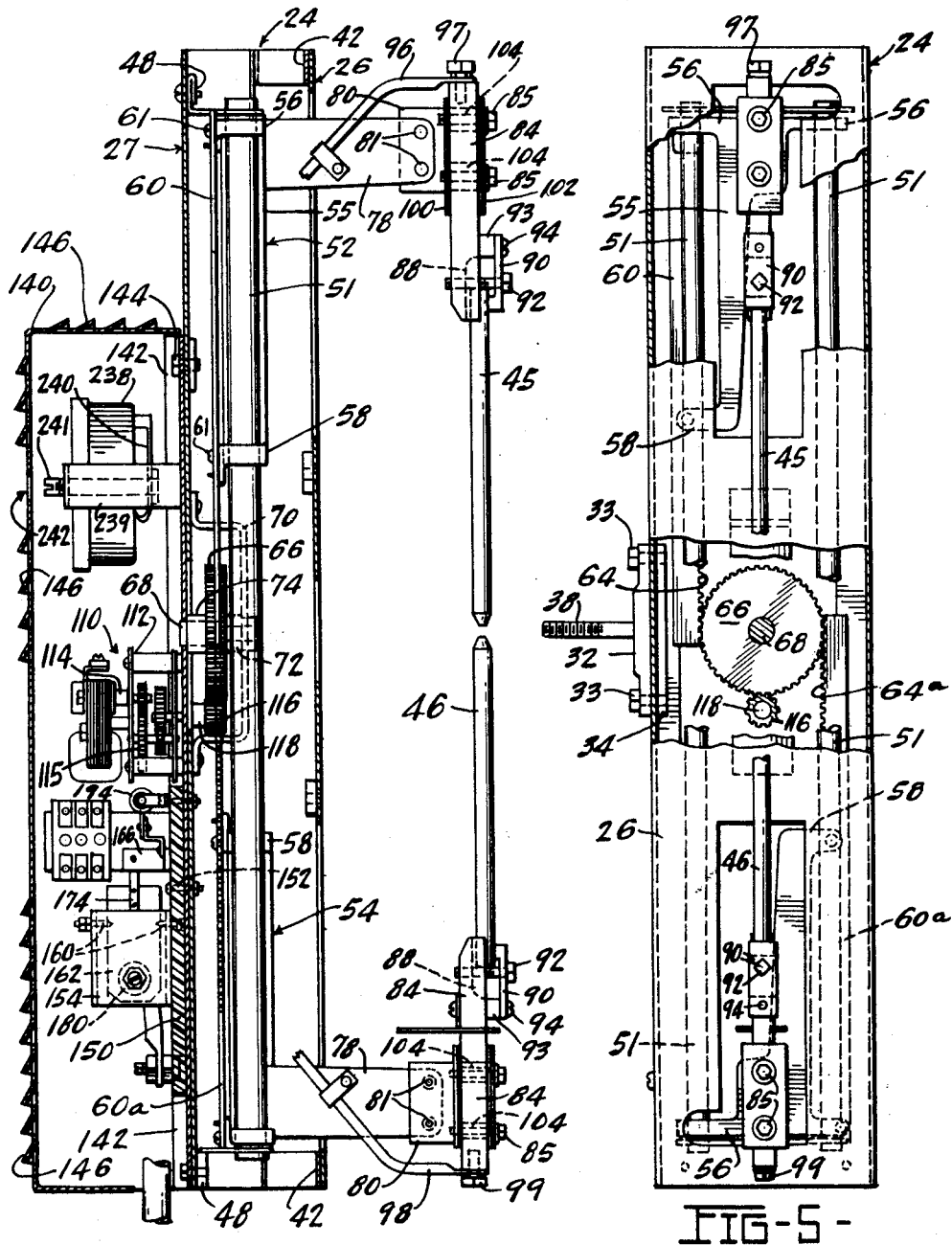

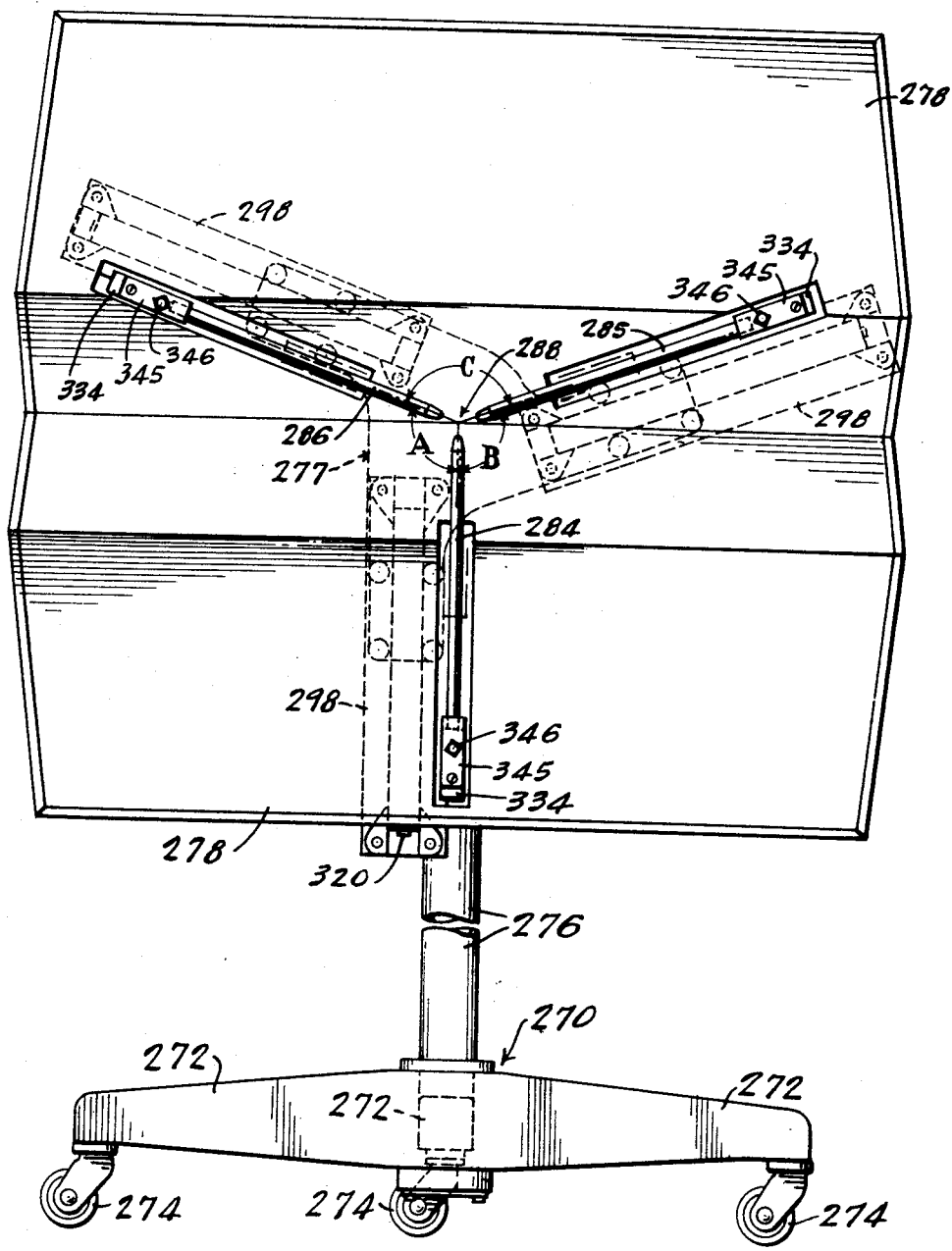
FIG-9-

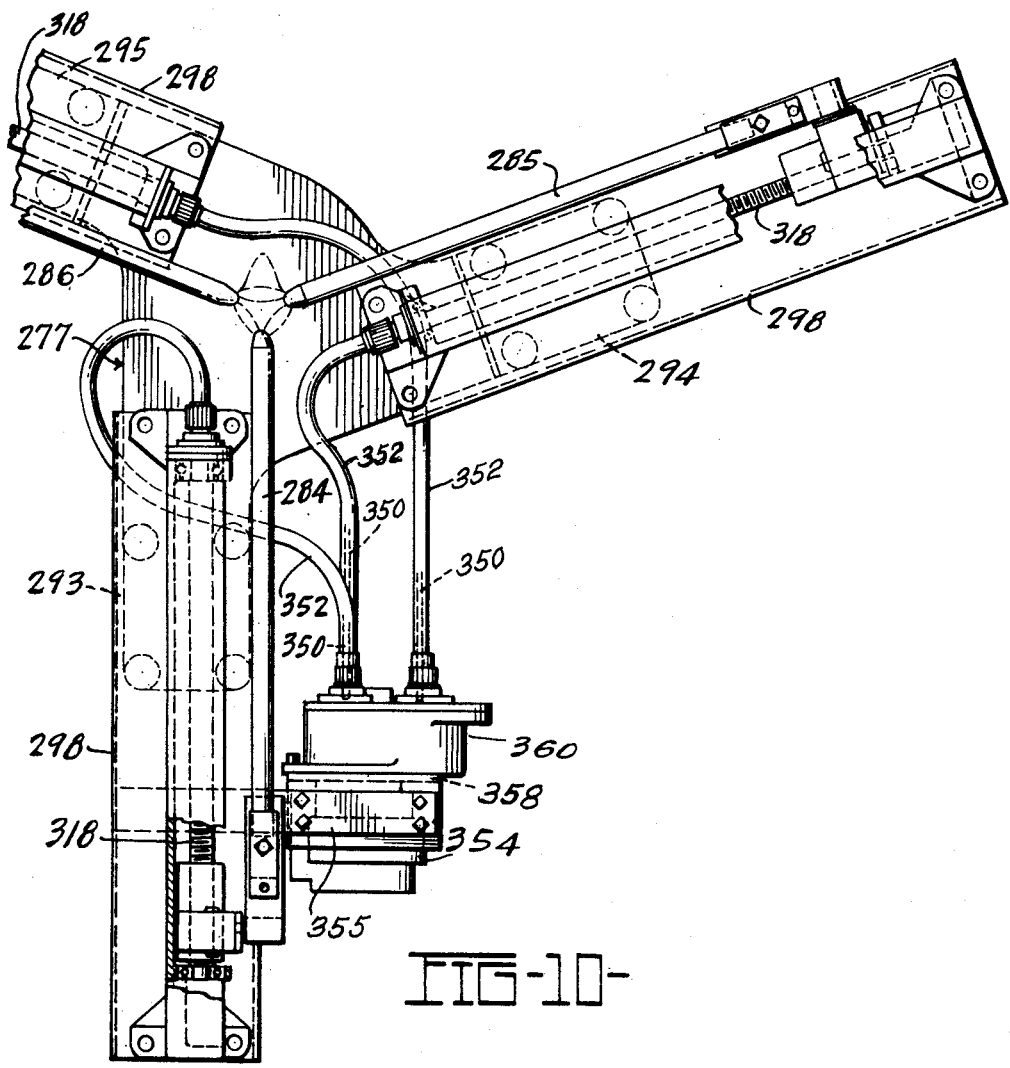

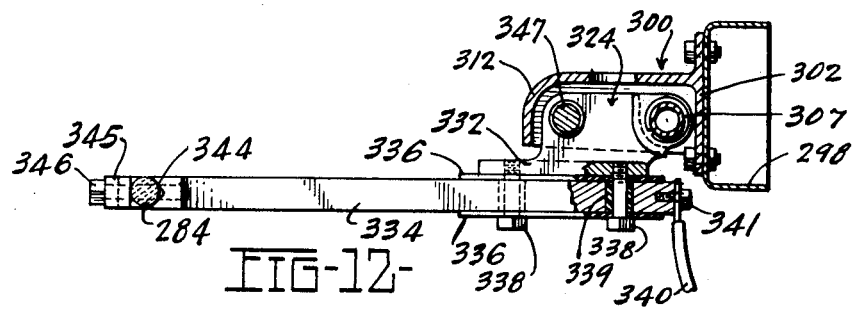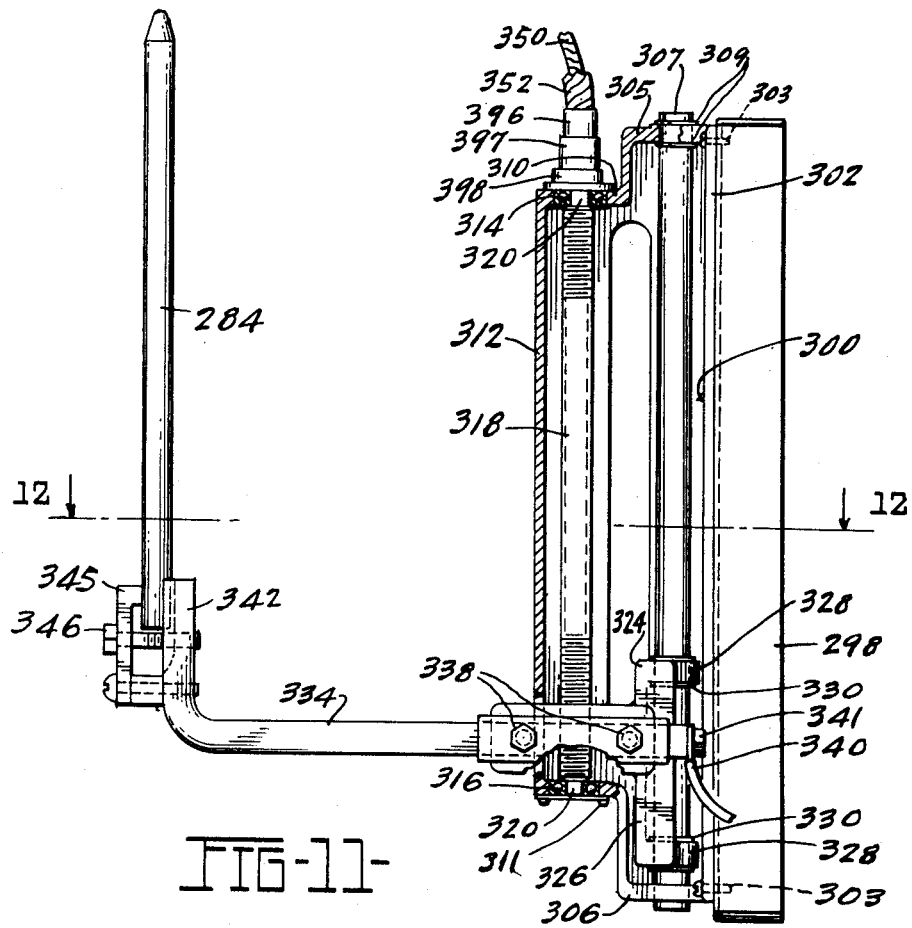

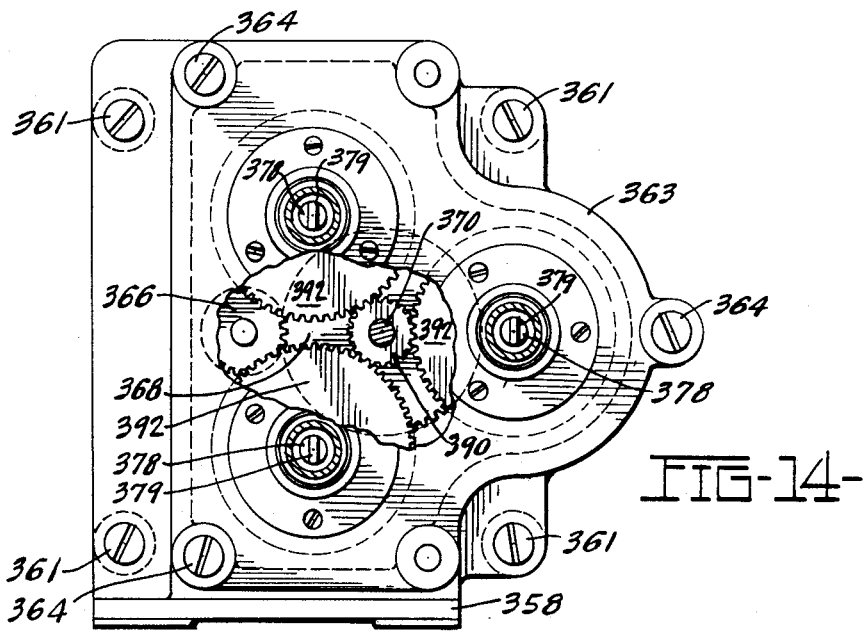
FIG-14-
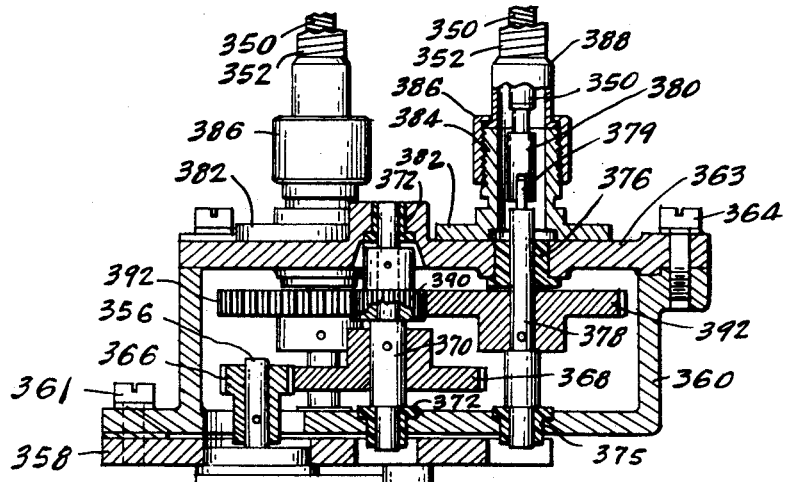
FIG-13-
Inventors:
JOHN W. WINZELER.
ARTHUR J. HATCH.
BY
Harry O. Einsberger
ATTY.

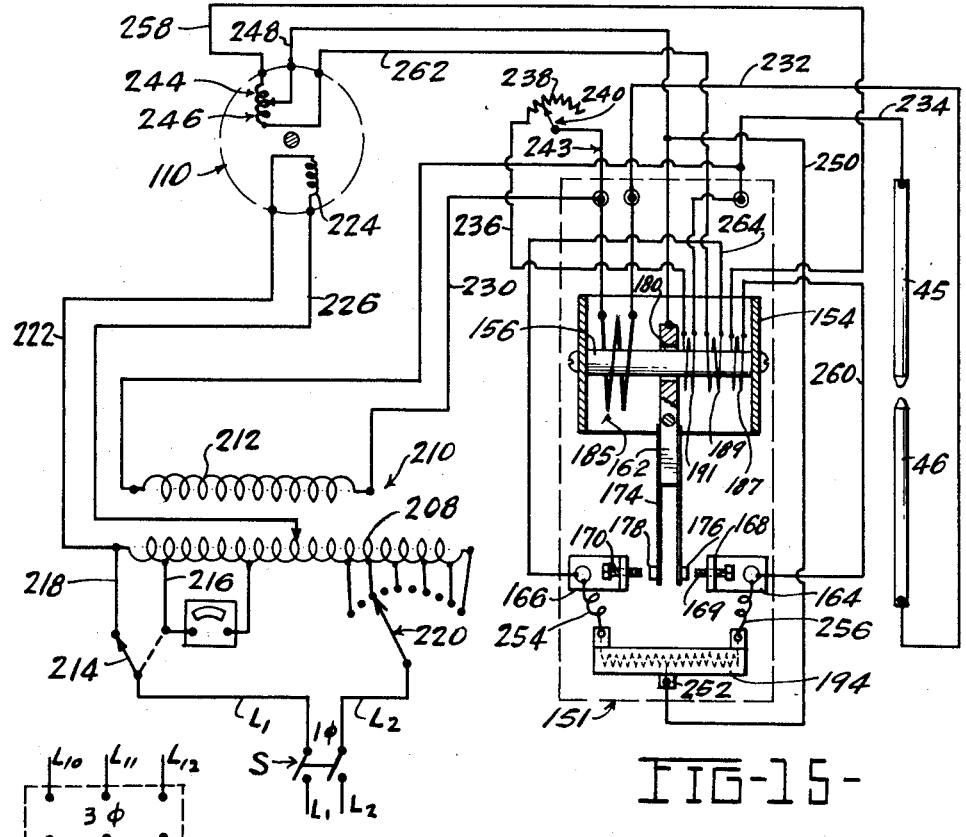
FIG-15-
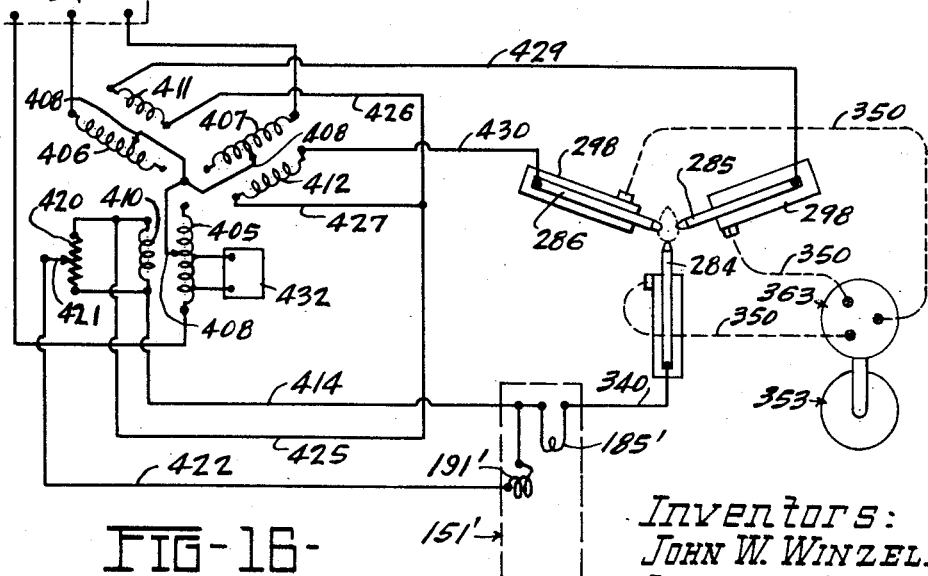
FIG-16-
Inventors:
JOHN W. WINZELER
ARTHUR J. HATCH.
BY
Harry O. Ernsberger
ATTY.

United States Patent Office 2,952,794
Patented Sept. 13, 1960

2,952,794
ARC LAMP

John W. Winzeler and Arthur J. Hatch, Toledo, Ohio, assignors to The Strong Electric Corporation, Toledo, Ohio, a corporation of Delaware Filed Oct. 3, 1957, Ser. No. 687,950

19 Claims. (Cl. 314—53)

This invention relates to arc lamps, and more particularly to arc lamps adaptable for use in the graphic arts field, but which may be employed wherever intense illumination of substantially constant intensity is required.

It is highly essential for graphic art reproduction operations to employ an arc lamp for illumination in which the arc may be quickly established and the arc characteristics maintained substantially constant in order to provide constant high-intensity illumination. It has heretofore been a practice to utilize a lever and solenoid mechanism disposed above and connected with one of the carbons or electrodes operable to initially move the adjacent carbon into contact with another carbon for striking the arc between the carbons, the arrangement including motive means for thereafter moving the carbons toward each other to compensate for the consumption or burning away of the carbons. During the operation of an arc lamp embodying an arc striking means of this character, the arc striking mechanism is usually arranged to actuate the uppermost carbon and is positioned above the arc where it is subjected to the intense heat and the fine particles of oxidized carbon or ash accumulate upon the components of the mechanism and eventually impair the operation thereof.

Another method for initially moving the carbons into contact for striking an arc involves moving the housing of the driving motor by solenoid means to bring the electrodes together to establish current flow. Such arrangement utilizes a motor adapted for rotation in only one direction to move the carbons toward each other to compensate for consumption of the electrodes. This type of arrangement does not provide an accurate control of the arc characteristics as the carbons burn away appreciably before the motor is energized to move the carbons toward each other to restore normal operating characteristics.

The present invention embraces a method and arrangement for maintaining electrodes of an arc lamp in proper spaced relation to provide at all times an arc of substantially constant intensity.

An object of the invention is the provision of an arrangement wherein the means for maintaining the arc substantially constant is utilized for initially striking the arc.

Another object of the invention is the provision of a method of control and mechanism for moving or adjusting the electrodes or carbons in both directions, the control mechanism being responsive to electromotive forces set up by current and voltage conditions in the circuits whereby an arc of substantially uniform operating characteristics is maintained irrespective of variations in current and voltage or by reason of variations in the burning rate of the carbons or electrodes employed.

Another object of the invention is the provision of a three phase, three electrode construction for producing an arc wherein the arc is maintained in a substantially constant relationship with a reflector and which provides substantially constant illumination irrespective of current or voltage variations.

Another object of the invention resides in the utilization of reversible motive means for actuating or moving the carbons or electrodes of an arc lamp in combination with control means for the motive means effective to maintain a substantially constant intensity arc and wherein the control means is adapted to energize the motive means for initially striking or forming the arc.

Another object of the invention is the provision of a three phase, three electrode arc lamp wherein the relative positions of the three electrodes may be maintained by a single driving means in conjunction with a control unit which is responsive to both current flow through the arc and voltage conditions for maintaining a three phase arc of substantially constant intensity.

Another object of the invention resides in the provision of a three phase, three electrode arc lamp wherein the electrodes are spaced to provide an arc that is stable and of constant intensity irrespective of the duration of the operating period of the arc.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is an isometric view illustrating one form of arc lamp embodying the invention;

Figure 2 is a side elevational view of the arc lamp construction illustrated in Figure 1 with the supporting stand removed;

Figure 3 is a top plan view of the construction shown in Figure 2;

Figure 4 is a vertical sectional view through the construction shown in Figure 2;

Figure 5 is a front elevational view of the construction shown in Figure 4 with certain parts broken away;

Figure 6 is a rear view of the construction shown in Figure 4 with the housing or cover removed;

Figure 7 is a detail sectional view taken substantially on the line 7—7 of Figure 6;

Figure 8 is a detail sectional view taken substantially on the line 8—8 of Figure 6;

Figure 9 is a front elevational view of an arc lamp construction embodying three electrodes for three phase operation;

Figure 10 is a front elevational view illustrating the three electrodes and the means for actuating the electrodes;

Figure 11 is a side elevational view of an electrode mounting for the lamp construction shown in Figure 9, certain portions of the apparatus being shown in section;

Figure 12 is a detail sectional view taken substantially on the line 12—12 of Figure 11;

Figure 13 is a sectional view illustrating the means for simultaneously driving or actuating three electrodes of the lamp construction shown in Figure 9;

Figure 14 is a plan view of the construction shown in Figure 13 with certain parts broken away for purposes of illustration;

Figure 15 is a schematic diagram of the circuit arrangement for controlling the movement or adjustment of the electrodes in the form of arc lamp illustrated in Figures 1 through 8; and Figure 16 is a schematic diagram of the circuit arrangement for controlling the movement or adjustment of the three electrodes for three phase operation of the lamp construction shown in Figures 9 through 14.

While the forms of arc lamp construction of the invention have particular utility for lighting purpose in the graphic arts field, it is to be understood that the invention may be utilized wherever substantially constant, high intensity illumination is desired.

Referring to the drawings in detail, one form of arc lamp construction of the invention is illustrated in Figures 1 through 8 inclusive. With particular reference to Figure 1, the lamp construction is mounted upon a stand or support preferably of portable character to facilitate moving the lamp to a desired position. The support illustrated in Figure 1 is inclusive of a base member 10 equipped with three projecting arms 12 each of which is equipped with a caster 14 arranged to rest upon a floor or other supporting surface.

Secured to the central region of the base plate 10 and extending upwardly therefrom is a tubular post 16 which telescopingly receives a tube 18, the latter being connected to the lamp structure. An adjustable collar 20 surrounds the tube 18 and is adapted to be clamped thereto by means of a winged screw 21 to adjust the lamp to the desired height. As particularly shown in Figures 2 and 3, the lamp structure is inclusive of a housing-like frame 24 formed of two channel shaped members 26 and 27, the side walls 28 of the housing member 26 overlapping the side walls 29 of member 27 and which are secured together by means of screws 30.

A fitting 32 is secured to a side wall 28 by means of bolts 33 extending into threaded openings in a plate 34 welded to the wall 28. The fitting 32 is formed with an annularly shaped portion 35 which is radially serrated as shown in Figure 3 and is adapted for cooperation with a fitting 37 secured to the upper end of the tube 18 as shown in Figure 1. The fitting 32 is equipped with a threaded member 38 which extends through an opening in the fitting 37 and receives a winged nut 40 as shown in Figures 1 and 3. A surface region of the fitting 37 adjacent the fitting 32 is also serrated for cooperation with the serrated surface 35 of the fitting.

Thus by releasing the winged nut 40, the frame 24 of the lamp structure may be adjusted or tilted about the axis of the threaded member 38 to vary the angular position of the lamp structure. The winged nut 40 may be drawn up to interengage the serrated surfaces of the member 32 and the fitting 37 to hold the lamp in adjusted position. Sheet metal brackets 42 are secured to the upper and lower ends of the frame members 26 and 27 to reinforce the frame construction.

In the form of the invention shown in Figures 1 through 8, the electrodes or carbons 45 and 46 are arranged in substantially axially aligned positions as shown in Figures 1, 2, 4 and 5, the adjacent tips of the electrodes being spaced during normal operation and current flowing through the electrodes after the arc is struck bridges or spans the gap between the electrodes to provide the arc. The frame 24 formed by the two channel shaped members 26 and 27 encloses and supports carriage means or carriers for supporting the electrodes in a manner whereby the electrodes are movable toward and away from each other for purposes hereinafter explained.

As particularly shown in Figures 4 and 5, there is secured to the frame member 27 adjacent each end region thereof an L-shaped bracket 48, each bracket being formed with a pair of transversely spaced openings to accommodate the end regions of vertically disposed tubes 51 or carriage guiding means upon which the electrode mounting carriages 52 and 54 are slidably supported. As the electrode supporting carriages 52 and 54 are of identical construction, a description of the upper carriage 52 will suffice for both.

As particularly shown in Figures 4 and 5, each electrode supporting carriage includes a longitudinally extending body portion 55, one end region thereof having laterally extending portions 56 which portions are bored to slidably accommodate the guide rods 51 so that the carriages will be slidable in vertical aligned relation. The opposite end region of the body portion 55 of each carriage is formed with a laterally extending portion 58 which is likewise bored to accommodate one of guide rods 51 so as to maintain the carriage in proper vertical alignment during slidable movements thereof along the guide rods 51.

Fixedly secured to the upper carriage 52 is a rack member 60 secured to the carriage by means of screws 61. The lower region of the member 60 is provided with rack teeth 64 which are in constant mesh with the teeth of a gear 66, the latter being fixedly secured upon a stub shaft 68. As shown in Figure 4, a bracket 70 is secured to the frame member 27, the bracket supporting a bearing member 72 and the frame member 27 supporting a bearing 74, the bearings 72 and 74 journally supporting the stub shaft 68.

The lower electrode supporting carriage 54 is likewise provided with a member 60a, the upper region of which is formed with rack teeth 64a which are also in constant mesh with the teeth of gear 66 in a region diametrically opposite to the region of enmeshment of the teeth 64 therewith as shown in Figure 5. Each of the electrode carriages 52 and 54 is formed with a forwardly extending arm 78, the extremity of which supports a fitting 80 secured to the arm by means of securing screws 81.

Secured to each of the fittings 80 by means of bolts 85 is a vertically disposed bar 84, the distal end region of each of the bars 84 being formed with a groove or recess 88 of V-shaped cross-section to accommodate the end region of the electrode. A clamp member 90 is disposed adjacent the recessed end of each bar 84 and is adapted to hold the electrode in the V-shaped recess by means of a clamping bolt 92. An end of each clamping member 90 is spaced from the bar by means of an abutment 93 which is held in place by means of a screw 94.

A current conducting cable 96 is connected to the uppermost bar 84 by means of a securing bolt 97. A similar current conducting cable 98 is secured to the lowermost bar 84 by means of a clamping screw 99. The cables 96 and 98 conduct current to the electrodes 45 and 46, the cables being of a flexible character to facilitate vertical movement of the electrodes and supporting carriages.

Each of the bars 84 is insulated from its supporting fitting by means of insulating plates 100 and 102 arranged at each side of the bar as shown in Figure 4. Each of the bars 84 is bored with an enlarged opening to accommodate the screws 85, and disposed in each of the enlarged bores is an insulating bushing 104. The insulating plates 100, 102 and the insulating bushings 104 electrically isolate the bars 84 from their supporting fittings 80.

As the rack members 60 and 60a are in mesh with the gear 66, rotation of the gear moves the carriages and electrodes concomitantly in directions toward or away from each other. The shaft 68 and gear 66 are rotated by electrically energizable means or motor 110 illustrated in Figures 2, 4 and 6. The motor 110 is supported upon a plate 112 carried by the frame member 27. The armature shaft 114 of the motor is connected through suitable reduction gearing 115 with a driving pinion 116 which is mounted upon a shaft 118 driven by the reduction gearing connected with the motor armature.

The lamp construction includes a reflector 122 provided for directing the light from the arc formed between the electrodes 45 and 46 to secure a desired light pattern for objective illuminating purposes. The reflector 122 is provided with flange portions which are secured to the housing member 26 by means of bolts 124.

Disposed above and below the reflector 122 are supplemental housings or members 130 and 132 formed with vertical flange portions which are secured to the housing 24 by means of screws 134 as shown in Figures 2 and 3. The ends of the members 130 and 132 are open as shown in Figure 3 to facilitate the flow of heat away from the arc. The reflector 122 is provided with suitable openings in registration with the members 130 and 132 to accommodate the electrodes. A slidably mounted receptacle or drawer 136 may be disposed beneath member 132 for the purpose of collecting ash or oxidized material of the carbons which may move downwardly through the member 132.

The motor 110 for actuating the electrode supporting carriages and the control components of the arrangement are disposed rearwardly of the frame or housing member 27 as shown in Figures 2, 4 and 6. The motor and control components for the lamp construction are preferably enclosed within a suitable housing 140 which is secured to longitudinally extending members 142 which in turn are secured to the housing member 27 by means of bolts 144. As shown in Figures 2 and 4, the top portion and rear wall of the housing 140 are formed with ventilating louvers 146 to facilitate circulation of air around the control components of the mechanism so that they may be maintained at safe operating temperatures.

The present invention includes a novel method, mechanism and circuit arrangement for initially striking the arc and thereafter maintaining the proper spacing between the electrodes through the provision of a reversible electrically energizable motor 110. The control for the motor includes means responsive to voltage and arc current for maintaining an accurate, efficient and instantaneous control of the arc characteristics to maintain an arc of substantially constant intensity after the initial formation of the arc.

The control components for the arc lamp are illustrated in Figures 4, 6, 7 and 8, and the circuit arrangement for the control components is illustrated in Figure 15. Mounted upon the rear surface of member 27 is a substantially rectangular member 150 of insulating material and is secured to the member 27 by means of screws 152. Secured to the plate 150 is a rectangular housing or enclosure 154 formed of metal. Disposed within the member or housing 154 and extending transversely thereof is a bar of soft iron 156 which forms a core to facilitate the traverse of electromagnetic or electromotive forces.

The core 156 forms a pole piece which is supported from opposed walls of the housing 154 by means of screws 158. The other walls of the housing 154 are provided with aligned threaded openings to receive screws 160 forming pivot pins upon which is pivotally supported an armature 162 for oscillation about the pivot pins or screws 160. The weight of the armature is distributed so that the same hangs or is suspended in a normal vertical position as shown in Figure 6.

Disposed above the armature housing 154 are L-shaped members 164 and 166 which are secured to the insulating plate 150 by means of screws 167. One leg of member 164 supports a contact screw 169 which is adjustable in a threaded opening in the portion 168. One leg of the L-shaped member 166 also supports a contact screw 170 which is threaded into a bore in member 166 and is adjustable relative thereto. Secured at each side of the armature 162 are flexible members 172 and 174, each member being formed of brass or similar material and extending above the armature 162, the distal upper ends thereof being provided with contacts designated 176 and 178, respectively.

The members 172 and 174 are of flexible character to accommodate movement of the armature 162 during circuit making and breaking operations. The portion of the armature 162 beneath the pivotal supports 160 is formed with an opening 180 through which extends the pole piece 156, the opening being of a diameter greater than the diameter of the pole piece 156 so that the armature 162 is free to oscillate under the influence of magnetic forces established in the pole piece 156 as hereinafter explained.

Surrounding the core or pole piece 156 at one side of the armature 162 is one or a few turns or convolutions of wire of large size forming a current coil 185 of high current carrying capacity in the arc circuit. The current coil 185 is in circuit with the electrodes or carbons in a manner hereinafter explained. Mounted upon the pole piece 156 at the opposite side of the armature 162 and surrounding the pole piece are three coils designated respectively by numerals 187, 189 and 191. The coils 187 and 189 are referred to herein as bucking coils and the coil 191 is a voltage coil.

Positioned above the contact supporting members 164 and 166 is an arc suppressing resistor 194 to minimize arcing at the contacts 169, 176, 170 and 178. A suitable terminal or junction block 198 is illustrated in Figure 6 at which connections of the various components are made, the connections not being shown. The components as shown in Figure 6 and herein described comprise a control relay for controlling the motor 110 to initially strike the arc and to thereafter actuate the electrodes 45 and 46 to maintain the arc substantially constant at all times during its operation.

The circuit of the control motor, the relay mechanism and the transformer arrangement for supplying power for operating the motor and supplying current through the electrodes to form the arc are illustrated in Figure 15. An alternating current supply designated L-1 and L-2 is connected with the primary 208 of a power transformer 210 having a secondary 212. The current supply conductor L-1 is connected to a range switch 214 which may be selectively engaged with current conductors 216 and 218 connected with the primary 208 for increasing or decreasing the voltage range of the secondary.

The current conductor L-2 is connected with a tap switch 220 for obtaining minute control of the effective voltage in the secondary 212. One end of the primary coil 208 is connected by means of a conductor 222 with a field coil 224 of the motor 110, the other end of the field coil being connected by means of a conductor 226 to an intermediate position of the primary. One end of the secondary 212 of the power transformer is connected by a lead 230 with one side of the current coil 185 surrounding the pole piece at one side of the armature 162.

The other end of the current coil 185 is connected by means of a lead 232 with the electrode or carbon 46. The electrode 45 is connected by means of a lead 234 to one end of the voltage coil 191 surrounding the pole piece 156 and disposed at a side of the armature 162 opposite the current coil 185. A voltage control rheostat 238, shown in Figures 4 and 6, is supported upon a bracket 239. The movable element 240 is mounted upon a shaft 241 which may be adjusted by a suitable tool inserted through an opening 242 in the housing 140.

The other end of the voltage coil 191 is connected by means of a lead 236 with the control rheostat 238, the movable element 240 of the rheostat 238 being connected by a lead 243 with one side of the current coil 185. Thus the voltage coil 191 and the rheostat 238 are connected across the secondary 212 of the power transformer 210.

In the control relay means of the invention, the ampere turns established through the current coil 185 by current flowing through the electrodes 45 and 46 and through the arc must balance or be equal to the ampere turns established through the utilization of the voltage coil 191 so that under normal operating conditions with an arc of desired intensity, there are no magnetic forces set up in the pole piece 156 which affect the position of the nonmagnetic armature 162.

It is to be understood that the armature 162 is preferably formed of a nonmagnetic material as, for example, aluminum, copper, brass or material capable of being influenced by unbalanced electromagnetic forces set up by reason of variations in current flow through the current coil 185 or by voltage variations impressed in the voltage coil 191.

It has been found that an armature 162 fashioned of aluminum is very satisfactory as such material is of comparatively light weight and hence the sensitivity of the control is enhanced by reason of the low inertia of a light weight material.

If current flow is increased in the current coil 185, this condition establishes unequal electromagnetic or electromotive forces which cause the armature 162 to swing in a direction to engage the contact 178 with the sationary contact 170. If current flow through the current coil 185 is decreased, the unbalanced electromagnetic or electromotive forces cause the armature 162 to swing about its fulcrum or pivot 160 in the opposite direction to bring the contact 176 into engagement with the stationary contact 169.

The motor 110 for actuating or driving the electrodes or carbons 45 and 46 is of the reversible type and is equipped with shading coils 244 and 246 illustrated diagrammatically in Figure 15 forming biasing means for controlling the direction of rotation of the motive means 110. The lead 248 which is common to the shading coils 244 and 246 is connected with the armature 162 and by means of lead 250 with the center terminal 252 of the arc suppressing resistor 194. One end of the resistor 194 is connected by means of a lead 254 with the member 166 while the opposite end of the resistor 194 is connected by means of a lead 256 with the member 164.

A lead 258 connects one end of the shading coil 244 with one terminal of the bucking coil 187, the other end of the bucking coil being connected by means of a lead 260 with the contact supporting member 164. A lead 262 connects the shading coil 246 with one terminal of the bucking coil 189, the other terminal of the coil 189 being connected by a lead 264 with the contact support 166.

When current flow through the current coil 185 is increased, the armature 162 is swung in a direction to engage the contact 178 with the stationary contact 170 completing the circuit through the shading coil 246 and the bucking coil 189 thus effecting a short circuiting of the bucking coil 189 and energizing the shading coil 246 causing the motor 110 to rotate in a direction to move the electrodes 45 and 46 away from each other.

The electrodes continue to move away from each other until the current flowing through the current coil 185 and through the electrodes is reduced to an amount to equalize the magnetic forces set up by energy in the current coil 185 and the voltage coil 191, nullifying the eddy currents formed in the armature 162 so that the armature swings to its central position as indicated in Figure 15. As soon as the contacts 170 and 178 are thus broken, the motor 110 comes to rest.

The foregoing described action of the relay occurs in the event of an increase in current flow between the electrodes. As the electrodes are continuously burned away, although at a comparatively slow rate, the arc becomes thinner thus descreasing the current flow through the electrodes and the current coil 185 and hence the voltage in the voltage coil 191 is increased establishing unbalanced electromagnetic forces effective to influence the armature 162, causing the armature 162 to swing in a direction engaging the contact 176 with the stationary contact 169.

This action completes a circuit through the bucking coil 187 and the shading coil 244 to reverse the direction of the motor 110 causing the latter to move the electrodes 45 and 46 toward each other until the current flow through the arc is increased. The increase in current flow in current coil 185 reestablishes a balance of the electromagnetic forces whereby the armature 162 is moved to its central or neutral position and restores the arc to its proper illuminating value.

As the eddy currents set up in the armature 162 are a linear function of the unbalanced electromagnetic forces set up by variations in current flow through the current coil 185 or voltage variations in the voltage coil 191, there are no forces tending to lock the armature contacts in engagement with the stationary contacts and hence the bucking and shading coils function during engagement of one set or the other of contacts to effect an infinitesimally small rotation of the armature of the motor 110.

Thus unbalanced electromagnetic forces effective to influence the position of the armature 162 are gradually modulated to a condition of balance through repeated instantaneous making and breaking of the contacts of one set or the other depending upon the direction of influence of the unbalanced electromagnetic forces on the armature 162.

During operation of the lamp, the arc between the electrodes 45 and 46 is thus accurately controlled to substantially constant intensity through the extremely sensitive action or operation of the relay armature 162 responsive to minute current flow and voltage variations in the arc or electrode circuit and voltage variations in the current supply to the power transformer 210.

The relay control arrangement of the present invention is operative to initially strike the arc by bringing the electrodes together without the use of extraneous devices or mechanisms. The action of the control relay arrangement in forming or initiating the formation of the arc is as follows: The operation of the lamp is controlled by a master switch S shown schematically in Figure 15 for connecting the the current supply to the primary 208 of the transformer 210.

When the lamp is extinguished by opening the control switch S, the current supply to the electrodes 45 and 46 is interrupted and the current supply to the field coil 224 of the motor 110 is likewise interrupted so that the electrodes or carbons 45 and 46 are in spaced relation and must be brought into actual engagement or contact in order to reestablish an arc. To initiate the operation of the lamp, the switch S is closed to establish current flow from the supply to the primary 208 of the transformer and to the field coil 224 of the motor.

The energization of the primary 208 establishes current in the secondary 212 of the power transformer and voltage is impressed in the voltage coil 191 and without current flowing through the current coil 185 because the electrodes are out of engagement. Thus substantial electromagnetic forces are established which are effective on the armature 162, swinging the latter in a direction to engage the contacts 176 and 169 energizing the shading coil 244 causing the armature of the motor 110 to rotate in a direction to feed the electrodes 45 and 46 toward each other until they are brought into actual contact or engagement to set up current flow through the electrodes and the current coil 185.

During this period, the counter electromagnetic forces set up in the bucking coil 187 are of such low magnitude as compared with the forces set up by the voltage impressed on the voltage coil 191 that they are ineffective to swing the armature 162 to effect a disengagement of the contacts 176 and 169. Such forces generated by the bucking coil 187 therefore have no effective influence upon the position of the armature 162 until after current flow is established through the current coil 185 which occurs when the electrodes are brought into contact.

As soon as current flow is established through the current coil 185, electromagnetic forces of much greater amplitude than those set up by the voltage coil 191 are set up which are effective to swing the armature 162 into its opposite position engaging the contacts 170 and 178. The closing of contacts 170 and 178 energizes bucking coil 189 and the shading coil 246 to reverse the rotation of the motor 110 and thereby withdrawing or moving the carbons or electrodes 45 and 46 away from each other forming an arc between the adjacent tips or extremities of the electrodes.

The motor 110 continues to rotate in a direction to separate the electrodes and, during such separation, the current flow through coil 185 and through the electrodes is progressively decreasing and hence the electromagnetic forces established by current flow through coil 185 are progressively decreased until they reach a value equal to the electromagnetic forces established in the voltage coil 191 acting counter to the forces established by current flow in coil 185. When the eddy currents set up in the armature 162 are thereby nullified, the armature moves to its central or neutral position and an arc of the desired intensity is maintained for which the control apparatus is adjusted.

The power transformer is designed to supply normal arc operating current of required or desired amperage. The arm or adjustable member 240 of the voltage rheostat 238 is adjusted so that electromotive forces of the ampere turns established by the voltage coil 191 are equal to electromotive forces of the ampere turns of the current coil 185 when accommodating the current flow desired to provide an arc of predetermined intensity. After the voltage rheostat 238 is adjusted so that during normal arc operations the armature 162 is maintained in a neutral or central position, no further adjustment of the rheostat 238 is required.

The switch 214 connected with certain number of turns of the transformer primary 208 may be moved to one or the other of its positions to change the voltage range and hence the voltage set up in the secondary 212. Minor or small variations in voltage may be had by adjusting the position of the tap switch 220 to increase or reduce the number of effective turns of convolutions in the primary 208 of the transformer.

Through this arrangement, variations in line voltage may be compensated by adjustment of the transformer primary. After the arc is struck and the electrodes moved to a spacing producing the arc of the intensity for which the apparatus is adjusted, the arc is maintained thereafter substantially constant through the above described operation of the control relay 151.

While the control relay arrangement and circuits illustrated in Figure 15 for controlling the characteristics of an arc established between two movable electrodes 45 and 46 wherein the relay controls a single reversible motor for simultaneously actuating the electrode carriages, a separate driving motor for each electrode carriage may be provided, one independent of the other but may be controlled through the use of the single relay 151. This may be accomplished by interconnecting the shading poles of two independent motors to establish concurrent rotation of the motors in the same direction as determined by the energization of the bucking coils and the shading coils.

It is also to be understood that an independent motor may be utilized for driving each electrode carriage through the use of separate gear mechanism and separate relays of the character of the relay 151 employed for individually controlling two motors in the same manner as hereinbefore described where a single relay controls a single motor. It should be noted that a novel feature of the control relay arrangement and its functioning in maintaining a substantially constant arc is that the relay is responsive to both current flow through the arc and voltage.

Hence the electromagnetic forces developed by current flow through the current coil 185 and the forces developed by the voltage coil 191 are at all times maintained in substantially equal amplitude acting in opposite directions under the influence of the energization of the bucking coils and shading coils instantly compensating for any minute differential between these opposing forces to thereby automatically maintain an arc of substantially constant intensity.

Figures 9 through 14 inclusive illustrate a modified form of arc lamp construction utilizing three carbons or electrodes for forming the arc which establish an arc through the utilization of three phase current supply, the position of the electrodes being controlled through the use of the control relay 151 hereinbefore described. Figure 16 is illustrative of a three phase circuit for use in establishing and controlling an arc set up at the adjacent extremities of three electrodes.

Figure 9 is a front elevational view of a three electrode arc lamp. The lamp structure of this form is supported upon a base 270 from which extends three arms 272, the extremity of each arm being equipped with a caster 274 adapted to engage a floor or other surface supporting the lamp structure. Extending upwardly from the base structure 270 is a tubular column 276 similar to the column 16 of the lamp structure illustrated in Figure 1.

A frame structure 277 is mounted upon the upper extremity of the column 276 which is adapted to support the reflector 278, the mechanism for mounting the electrodes, the feeding means therefor and the relay construction 151 illustrated in Figures 4, 6, 7 and 8. The reflector 278 is formed with planar surfaces angularly arranged to reflect or redirect light from the arc to secure desired light distribution over an area to be illuminated.

The three electrodes are illustrated in Figures 9 and 10 designated respectively 284, 285 and 286.

The preferred angular relationship of the electrodes one with another is illustrated in Figure 9, and it should be noted that the electrode 284 is preferably disposed in a vertical position while the electrodes 285 and 286 are downwardly inclined toward the axis of the electrode 284, the projected axes of the three electrodes intersecting at a central region designated 288 in which the arc is established by current flow through the three electrodes.

The angles between the vertical electrode 284 and the electrodes 285 and 286 are preferably identical and of a lesser number of degrees than the included angle between the axes of the electrodes 285 and 286. For example, the included angles A and B may be 110° while the included angle between the axes of the electrodes 285 and 286 indicated at C is 140°. This relationship of angularities of the electrodes has a direct influence upon the stability of the arc. The current flow from the extremities of the electrodes affects the arc flame and to secure a satisfactory arc, the flame should be maintained as stable as possible.

The current flow from the extremities of the electrodes 285 and 286 which are inclined downwardly tends to bend or divert the arc flame downwardly. However by making angle C between the upper electrodes greater than the included angles between the upper electrodes and the vertical electrode 284, the arc flame tends to bisect the angle C so that the arc flame remains in a vertical position substantially along the axis of the vertically disposed electrode 284.

The electrodes may be disposed in other angular relationships but if the angularities of the electrodes are not such as to establish a stable flame, other means as, for example, a jet of air or a region of suction or subatmospheric pressure set up adjacent the arc flame in order to control the flame. The mounting means and driving means for the electrode carriages or carriers are best illustrated in Figures 10 through 14.

The electrode supporting carriages, the carriage supporting means and the driving means for the electrode carriages are substantially identical and hence the description of one will suffice for all. Disposed at the rear of the reflector 278 is the frame member 277 shown in Figure 10 which is configurated with three projecting arms or portions 293, 294 and 295 which respectively support the electrode mounting means. Associated with each of the arms is a channel shaped frame member 298 to which is secured a member 300, the latter having an elongated plate-like portion 302, the ends of which are secured to the channel shaped member 298 by means of screws 303.

Extending forwardly of the plate-like member 302 adjacent the ends thereof are portions 305 and 306 as particularly shown in Figure 11. The projecting portions 305 and 306 are provided with openings into which extend a guide member or tube 307 which is secured in position by snap rings 309 extending into grooves formed in the upper portion of the guide tube 307 so that the snap rings 309 are disposed at each side of the projection 305.

Integrally formed on the projections 305 and 306 are offset portions or ledges 310 and 311, these portions being connected by a longitudinally extending web 312 to enhance the rigidity of the structure 300. As particularly shown in Figure 11, the ledge portions 310 and 311 are bored to accommodate anti-friction or ball bearings 314 and 316.

Disposed between the bearings 314 and 316 and extending parallel with the guide tube 307 is a feed screw or carriage moving means 318 formed with tenons 320 at its end regions which extend into the bearings 314 and 316 whereby the feed screw 318 is rotatably journaled in the bearings. Each of the electrode feeding units is equipped or provided with an electrode carriage or carrier 324 particularly illustrated in Figures 11 and 12.

Each of the carriages 324 includes a member 326 formed with spaced projections 328 which are bored to accommodate bearing members or bushings 330 which are preferably formed of nylon (polyamide resin), the bearing members 330 being bored to accommodate the guide tube 307 and are slidable along the tube. Nylon bearings 330 are preferred because they are found to have exceptionally long life and require no lubrication. The carriage 324 is provided with a laterally extending pad or plate portion 332 which forms a means for supporting a forwardly extending bar or member 334, the latter directly supporting the electrode.

The bar 334 is insulatingly supported upon the plate portion 332. Disposed at each side of the bar 334 are sheets 336 of suitable insulating material. The plate portion 332 is provided with threaded openings to receive screws 338 for securely fastening the bar 334 to the carriage 324.

The bar 334 is provided with enlarged openings at the regions of the screws 334 to accommodate bushings or sleeves 339 formed of suitable insulating material. In this manner the electrode supporting bar 334 is completely insulated from the supporting carriage 324.

A current conductor 340 is connected to the electrode supporting bar by a securing bolt 341. The outer end region of the bar 334 is formed with a portion 342 extending at right angles to the major portion of the bar, the portion 342 being fashioned with a V-shaped groove 344 to accommodate the electrode. A clamping member 345 is secured to the portion 342 of the bar by means of a screw 346 whereby the electrode is securely clamped to the portion 342 with the electrode properly positioned in the V-shaped groove 344.

The carriage 324 is provided with a threaded opening 347 in axial alignment with the axis of the feed screw 318, the threads of the opening cooperating with the threads on the feed screw 318 whereby rotation of the feed screw causes movement of the carriage longitudinally of the guide tube or member 307. Thus by rotating the feed screw 318, the electrode may be moved in either direction depending upon the direction of rotation of the feed screw.

In the embodiment of the three electrode arc lamp illustrated in the drawings, the electrode feed screws 318 are driven from a single motor 353, shown schematically in Figure 16, through suitable power transmission mechanism or gearing illustrated in Figures 13 and 14. In the embodiment illustrated, the gearing driven by the motor is operatively connected with the feed screws 318 through flexible cables or shafts 350, each of the flexible shafts being contained within a flexible sheath 352.

The motor 353 for concomitantly driving the three electrode feed mechanisms is contained within a housing 354 secured to a suitable support 355. The motor 353 is inclusive of an armature and reduction gearing (not shown) contained within the housing 354, the reduction gearing being connected with an output shaft 356 shown in Figure 13. A supporting plate 358 for the motor housing is disposed between the motor housing 354 and a housing 360, the latter containing power transmission speed reducing gearing for driving the three flexible shafts 350 connected respectively to the electrode feed screws 318.

The gear case 360 is secured to the supporting plate by means of screws 361, the plate 358 being adapted to be secured to the frame construction which supports the electrode feeding mechanisms. The gear case 360 is provided with a removable cover 363 which is held in place by means of screws 364. The motor output shaft 356 is equipped with a pinion 366 in mesh with a gear 368 secured to an intermediate shaft 370. The shaft 370 is journaled in suitable bearings 372 respectively mounted in the gear housing 360 and the cover 363.

Journally supported in sets of bearings 375 and 376 respectively mounted in the gear housing wall 360 and the cover 363, one set of the bearings being illustrated in Figure 13, are stub shafts 378. The upper end region of each of the stub shafts 378 is formed with a tongue 379 which extends into a slot or recess formed in a fitting 380, one of the fittings being secured to the end of each of the flexible shafts or cables 350, one of these connections being illustrated in detail in Figure 13.

A mounting plate 382 surrounds each of the couplings between the stub shafts 378 and the fittings 380, the plates 382 being formed with upwardly extending threaded projections 384 adapted to receive clamping nuts 386 which engage flanges formed on fittings 388 attached to the end regions of each of the shaft enclosing sheaths 352. As shown in Figure 13, the clamping nuts 386 when drawn up securely hold the fittings 388 in engagement with the projections 384 and maintain the shaft fittings 380 in operative connection with the stub shafts 378 through the tongue and slot couplings.

The shaft 370 supports a pinion 390 in the manner shown in Figure 13, the pinion 390 being in constant mesh with three gears 392 as shown in Figure 14. The driven gears 392 are of the same size and are respectively mounted upon the three stub shafts 378. The gears 392 are concomitantly driven by the driving pinion 390.

The opposite end region of each of the flexible driving shafts or cables 350 is connected by a tongue and slot connection with the tenon 320 formed at the upper end of each of the feed screws 318 shown in Figure 11. The extremities of the sheaths 352 adjacent the feed screws 318 are equipped with fittings 396 which are secured in position by means of coupling nuts 397 to members 398 supported upon the ledges 310 of members 300 to hold the flexible shafts 350 in operative connection with the feed screws 318.

From the foregoing, it will be apparent that the motor 353 within the housing 354, through reduction gearing contained in the motor housing rotates the output shaft 356 at a comparatively slow speed, and the pinion 366 in mesh with gear 368, the latter being of a larger diameter than the pinion 366, drives the stub shaft 370 at a reduced speed. The pinion 390 mounted on the stub shaft 370 being of substantially lesser diameter than the gears 392, drives the gears 392 at a reduced speed.

Thus through the medium of the three driven gears 392, which are of identical diameters, the feed screws 318 are rotated at the same speeds and simultaneously advance or retract the electrode supporting carriages 326, the direction of movement of the carriages being dependent upon the direction of rotation of the output shaft 356 of the motor.

The three electrode lamp illustrated in Figures 9 through 14 is controlled by the relay mechanism illustrated in Figures 4, 6, 7 and 8 in substantially the same manner that the lamp shown in Figures 1 through 6 is controlled. Figure 16 is a schematic diagram illustrating the three phase circuit for the three electrode arc lamp construction.

The three lines of the three phase current supply are indicated at L–10, L–11 and L–12. The three transformer primaries or primary coils are designated respectively 405, 406 and 407, one end of each primary being connected with one of the current supply leads. The primaries are rendered adjustable by means of tap switches indicated diagrammatically at 408. The transformers may be of Y or delta configuration and any suitable switching system may be used to secure line adjustment of the primaries.

The primaries of the transformer are associated with secondaries or secondary coils designated respectively 410, 411 and 412. The control relay indicated at 151' is illustrated diagrammatically in Figure 14 and is of the same construction as the control relay 151 shown in Figures 4, 6, 7 and 8. As shown in Figure 16, one end of the secondary 410 is connected by a lead 414 with the current coil 185', the current coil being connected by a lead 340 with the vertically disposed electrode 284. As shown in Figures 11 and 12, the lead 340 is secured to the electrode supporting bar 334 by means of a securing screw 341.

Connected across the transformer secondary 410 is a potentiometer 420, the movable contact 421 thereof being connected by lead 422 with a voltage coil 191' of the relay, the voltage coil being connected with the lead 414 illustrated in Figure 16. Thus the voltage may be adjusted by modifying or changing the position of the movable member 421 of the potentiometer 420. The bucking coils in the relay 151' are connected to shading coils (not shown) associated with the motor 353 contained in housing 354 in the same manner that the bucking coils are connected with the shading coils of motor 110 illustrated in the circuit diagram, Figure 13.

The selective energization of the bucking coils by reason of unbalanced electromagnetic forces set up in the relay armature by voltage or current variations are effective to cause rotation of the motor 353 in either direction.

The secondaries 410, 411 and 412 are connected together by means of leads 425, 426 and 427. The opposite end of the secondary 411 is connected by a lead 429 with the electrode 285 and the end of the secondary 412 is connected by lead 430 with the third electrode 286. A voltage meter indicated diagrammatically at 432 may be connected across any one of the primaries of the power transformer.

The operation of the three electrode lamp is substantially the same as far as control is concerned as the operation of the two electrode lamp hereinbefore described. Whenever the current flow varies in the current coil 185' or the voltage varies in the voltage coil 191' an unbalance electromagnetic force exists or is set up which moves the armature 162 of the relay control shown in Figure 15 to a position energizing the motor 353, driving the motor to move the electrodes in a direction determined by the character of the unbalance condition affecting the control relay.

For example, if the current flow through the arc is reduced, the current flow through the coil 185' is reduced setting up an unbalance condition which moves the relay armature to energize one of the bucking coils to energize the motor and feed the electrodes toward each other until the increased current flow in the arc and in the current coil 185' establishes a balance to maintain the armature 162 in neutral position.

If the current flow through the arc increases, the current flow in current coil 185' increases and the motor 353 is energized through the other bucking coil to rotate the motor in a reverse direction and move the electrodes away from one another until the electromagnetic balance is restored or equalized and the relay armature moved to neutral position deenergizing the motor.

The control relay is subservient to voltage variations so that if voltage of the voltage coil 191' is changed, the electromagnetic forces affecting the relay armature become unbalanced and the motor 353 rotated in a direction to restore the arc to its normal condition.

During arc operation should one of the electrodes burn slightly faster or slower than the remaining electrodes, the current flowing through such electrode will be modified. Thus if an electrode is momentarily burning at a faster rate, the current flowing through that electrode is reduced because of the increased gap and the current being greater through the other two electrodes effects a normal burning of said two electrodes so that, in a comparatively short period of time, the current flow through the three electrodes is restored to the same value. Hence the arc always remains in a substantially constant position.

While the current coil 185' of the control relay is shown connected with the vertical electrode 284, it is to be understood that the current coil may be connected in series with one of the other electrodes.

The voltage coil may also be connected in a variety of ways and perform its function in the control relay. For example, it may be connected in any leg of a secondary from one end to the center. An adjustable resistor of the character indicated at 238 may be utilized in lieu of the potentiometer 420. By including two additional voltage coils in the relay, a voltage coil may be associated with each of the three secondaries of the power transformer and each responsive to the voltage in its associated secondary.

While the three electrodes of the lamp shown in Figures 9 through 14 are illustrated as operated by a single motor and one relay, it is to be understood that other combinations may be employed for controlling the constancy of the arc of the three electrode arrangement. For example, an individual motor may be employed for adjusting the position of each electrode and each such motor may be controlled by an individual relay.

As an alternative, an individual motor may be provided for adjusting each electrode and the operation of the motors may be controlled by a single relay of the character hereinbefore described. Thus several combinations of electrode adjusting means and relay control arrangement therefor may be employed successfully where the control relay means is influenced or operated by both voltage and current flow.

It is apparent that, within the scope of the invention, modifications and different arrangements may be made other than is herein disclosed, and the present disclosure is illustrative merely, the invention comprehending all variations thereof.

We claim:

1. In an arc lamp, in combination, relatively movable electrodes adapted to be adjusted to form an arc, motive means for concomitantly adjusting the electrodes, a current circuit for the electrodes including means adapted to establish electromotive forces upon current flow through the electrodes, a voltage circuit associated with the power supply for the electrodes establishing electromotive forces, and nonpolarized relay means responsive to variations in the electromotive forces to actuate the motive means for adjusting the relative positions of the electrodes to maintain constant the arc established through current flow through the electrodes.

2. In an arc lamp, in combination, relatively movable electrodes adapted to be spaced to form an arc, reversible motive means for concomitantly moving the electrodes in different directions to maintain the arc in a relatively fixed position, a current circuit for the electrodes including means adapted to establish electromotive forces upon current flow through the electrodes, a voltage circuit associated with the power supply for the electrodes including means adapted to establish electromotive forces, and relay means having an armature of nonmagnetic material responsive to variations in the electromotive forces to actuate the motive means, and biasing means associated with the relay means and the motive means arranged to predetermine the direction of movement of the motive means to maintain constant the arc established through current flow through the electrodes.

3. In an arc lamp, in combination, relatively movable electrodes adapted to be spaced to form an arc, a carriage for each electrode, electrically-energizable motive means for concomitantly moving the carriages and electrodes to maintain the arc in a relatively fixed position, a current circuit for the electrodes including means adapted to establish electromotive forces upon current flow through the electrodes, a voltage circuit including means associated with the power supply adapted to establish electromotive forces, nonpolarized relay means associated with the current and voltage circuits responsive to changes in the electromotive forces to actuate the motive means for maintaining constant the arc established by current flow through the electrodes, said relay means being rendered effective by voltage in said voltage circuit prior to the establishment of current flow through the electrodes for energizing the motive means to move the carriages to interengage the electrodes and strike the arc.

4. In an arc lamp, in combination, three relatively movable electrodes adapted to be spaced to form an arc, electrically-energizable motive means for concomitantly moving the electrodes to maintain the arc in a relatively fixed position, a current circuit for the electrodes including means adapted to establish electromotive forces upon current flow through the electrodes, a voltage circuit including means adapted to establish electromotive forces, nonpolarized relay means responsive to changes in the electromotive forces to actuate the motive means in directions to maintain constant the arc established by current flow through the electrodes, said relay means being rendered effective by voltage in said voltage circuit prior to the establishment of current flow through the electrodes for energizing the motive means to concomitantly interengage the electrodes to initiate the arc.

5. In an arc lamp, in combination, relatively movable electrodes adapted to be spaced to form an arc, electrically-energizable reversible motive means for concomitantly moving the electrodes, biasing means associated with said motive means for controlling the direction of movement thereof, a current circuit for the electrodes including a current coil adapted to set up electromotive forces upon current flow through the electrodes, a voltage circuit including a voltage coil adapted to set up counter-electromotive forces, a core extending through both the current and voltage coils, movable nonmagnetic armature means associated with said current and voltage coils responsive to differentials in said electromotive forces set up in said current and voltage coils for energizing the biasing means to actuate the motive means and electrodes in a direction to maintain constant the arc established by current flow through the electrodes, said movable means being rendered effective by voltage in said voltage circuit prior to the establishment of current flow through the electrodes for energizing the biasing means for activating the motive means in a direction to interengage the electrodes and initiate current flow through the electrodes for striking the arc.

6. In an arc lamp, in combination, electrodes adapted to be spaced to establish an arc, a relatively movable carriage means supporting each of said electrodes, circuit means for conveying electrical energy through the electrodes, an electrically-energizable motive means, means establishing driving connection between said motive means and the electrode carriages, relay means including a current coil and main and supplemental voltage coils, an armature of nonmagnetic material associated with said coils, biasing circuits including the supplemental voltage coils for said motive means for controlling the direction of moving thereof, circuit establishing means associated with the armature for selectively energizing said biasing circuits for controlling the direction of movement of the motive means, said armature being responsive to forces set up by the voltage coil and current coil for energizing the biasing circuits for initially moving the electrodes into engagement to form the arc and thereafter maintain the arc at substantially constant intensity.

7. In an arc lamp, in combination, electrodes adapted to be spaced to establish an arc, a relatively movable carriage means supporting each of said electrodes, circuit means for conveying electrical energy through the electrodes, an electrically-energizable reversible motor, means establishing driving connection between said motor and the electrode carriages, relay means including an elongated core, a current coil in the electrode circuit means and a voltage coil surrounding the core, an armature of nonmagnetic material having a portion disposed between said current coil and said voltage coil, biasing circuits for said motor for controlling the direction of rotation of said motor, circuit establishing means associated with the armature for selectively energizing said biasing circuits for controlling the direction of rotation of the motor, said armature being responsive to electromotive forces set up by the voltage coil and current coil for energizing the biasing circuits to initially engage the electrodes to form the arc and thereafter maintain constant the current flow through the arc.

8. In an arc lamp, in combination, electrodes adapted to be spaced to establish an arc, a relatively movable carriage means supporting each of said electrodes, circuit means for conveying electrical energy through the electrodes, an electrically-energizable reversible motor, means establishing driving connection between said motor and the electrode carriages, relay means including a current coil and a voltage coil, bucking coils in said relay means, an armature of nonmagnetic material, biasing circuits for said motor including said bucking coils for selectively controlling the direction of rotation of said motor, said biasing circuits being controlled by the relative position of the armature for selectively energizing said biasing circuits to control the direction of rotation of the motor, said armature being responsive to electromotive forces set up by the voltage coil and current coil for energizing the biasing circuits to initially move the electrodes into engagement to form the arc and thereafter maintain the arc at substantially constant intensity.

9. In an arc lamp, in combination, electrodes adapted to be spaced to establish an arc, an electrode mounting member for each electrode, electrically-energizable reversible motive means, motion transmitting means associated with the electrically-energizable motive means for moving the electrode mounting members to vary the relative positions of the electrodes, circuit means for supplying current to said electrodes and to the electrically-energizable motive means, relay means responsive to current flow and voltage variations for energizing the electrically-energizable motive means, biasing means associated with said relay means for controlling the direction of movement of the motive means for controlling the characteristics of an arc at the spaced region of the electrodes, said relay means being responsive to voltage for energizing the motive means to initially engage the electrodes to form the arc.

10. In an arc lamp, in combination, three electrodes adapted to be spaced to establish an arc, a relatively movable carriage for each electrode, electrically-energizable reversible motive means, motion transmitting means connected with said motive means for concomitantly moving the electrode carriages to vary the relative positions of the electrodes, circuit means for supplying current to said electrodes and to the electrically-energizable motive means, relay means responsive to current flow and voltage variations for energizing the electrically-energizable motive means, biasing means associated with said relay means for controlling the direction of movement of the motive means for maintaining an arc at the region of convergence of the electrodes of substantially constant intensity, said relay means being adapted to energize the motive means to initially engage the electrodes to form the arc.

11. In an arc lamp, in combination, a frame, electrode carriers supported upon the frame and relatively movable with respect to the frame, electrodes mounted on said carriers and arranged to form an arc, electrically-energizable motive means, means connecting the motive means with the electrode carriers for moving the carriers to adjust the relative positions of the electrodes, circuit means for conducting current to said electrodes and to the motive means, relay means for controlling the operation of the motive means, said relay means including a current coil in the electrode circuit means and a voltage coil, bucking coils and an armature in said relay, connections between said bucking coils and said motive means whereby selective energization of the bucking coils effects change in direction of rotation of the motive means, said relay armature being responsive to voltage and arc current to selectively energize the bucking coils and the motive means whereby the electrodes are positioned to maintain the arc substantially constant.

12. In an arc lamp, in combination, electrodes adapted to be spaced to establish an arc, electrically-energizable means for moving the electrodes, circuit means for supplying current to the electrodes and the electrode moving means, control means for said electrode moving means including a nonpolarized relay having a relatively movable armature of nonmagnetic material, said relay including an elongated core, a current coil in the electrode circuit means and a voltage coil, said coils surrounding the core and being disposed respectively at opposite sides of the armature, biasing circuits for controlling the direction of movement of the electrode moving means, said biasing circuits being controlled by said armature, the electromotive forces set up in said current coil and said voltage coil being in balance when an arc of predetermined intensity is established, said armature being responsive to variations in the electromotive forces to selectively energize the biasing circuits of the electrode moving means to reestablish the arc of predetermined intensity.

13. In an arc lamp, in combination, electrodes arranged to be spaced to form an arc, a relatively movable carriage supporting each electrode, electrically-energizable reversible motive means arranged to move said carriages to modify the positions of said electrodes, relay means for controlling the operation of said motive means, said relay means including a current coil and a voltage coil adapted to set up electromotive forces, an armature, bucking coils disposed to influence the armature, shading coils associated with the motive means and connected respectively with the bucking coils, circuit means controlled by the armature for selectively energizing the shading coils for initiating operation of the motive means in a direction dependent upon the relative position of the armature, said armature being responsive to variations in the electromotive forces to energize the motive means and thereby adjust the position of the electrodes to maintain the arc substantially constant.

14. In an arc lamp, in combination, three electrodes adapted to be spaced in converging relation to establish an arc, one of said electrodes being in a substantially vertical position, said other electrodes being spaced less than 120 degrees from the vertical electrode, a movable mounting member for each electrode, electrically-energizable motive means for moving the electrode mounting members to vary the relative positions of the electrodes, circuit means for supplying current to said electrodes and to the electrically-energizable motive means, relay means for maintaining the arc at a substantially constant intensity, said relay means being adapted to energize the motive means to initially engage the electrodes to form the arc.

15. In an arc lamp, in combination, relatively movable electrodes adapted to be adjusted to form an arc, motive means for adjusting the electrodes, a current circuit for the electrodes including means adapted to establish electromotive forces upon current flow through the electrodes, a voltage circuit establishing electromotive forces, nonpolarized relay means responsive to the electromotive forces to actuate the motive means for adjusting the relative position of the electrodes, and means for regulating the influence of the electromotive forces on the motive means.

16. In an arc lamp, in combination, relatively movable electrodes adapted to be adjusted to form an arc, motive means for adjusting the electrodes, a current circuit for the electrodes including means adapted to establish electromotive forces upon current flow through the electrodes, a voltage circuit establishing electromotive forces, nonpolarized relay means responsive to the electromotive forces to actuate the motive means for adjusting the relative position of the electrodes, and means associated with the voltage circuit for regulating the influence of the electromotive forces on the motive means.

17. In an arc lamp, in combination, electrodes disposed to establish an arc, electrically energizable reversible motive means for moving the electrodes, circuit means for supplying current to the electrodes and the motive means, biasing circuits for said motive means for determining the direction of movement of said motive means, relay means including an elongated core, a current coil in the electrode circuit means, a main voltage coil, a pivotally supported armature bar of nonmagnetic material having an open region accommodating the core, said current and main voltage coils being disposed at opposite sides of the armature bar, supplemental voltage coils surrounding said core and connected respectively in said biasing circuits, said biasing circuits being controlled by said armature, the electromotive forces set up in said current coil and said main voltage coil being in balance when an arc of predetermined intensity is established, said armature being responsive to variations in the electromotive forces to selectively energize the biasing circuits and effect movement of the motive means for maintaining the arc of predetermined intensity.

18. In an arc lamp, in combination, electrodes disposed to establish an arc, electrically energizable reversible motive means for moving the electrodes, circuit means for supplying current to the electrodes and the motive means, biasing circuits including shading coils for said motive means, relay means including an elongated core, a current coil in the electrode circuit means, a main voltage coil, a pivotally supported armature bar of nonmagnetic material having an opening accommodating the core, said current and main voltage coils being disposed at opposite sides of the armature bar, supplemental voltage coils surrounding said core and connected respectively with said shading coils in the biasing circuits, said biasing circuits being controlled by said armature, the electromotive forces set up in said current coil and said main voltage coil being in balance when an arc of predetermined intensity is established, said armature being responsive to variations in the electromotive forces to selectively energize the biasing circuits of the motive means to maintain the arc of predetermined intensity.

19. In an arc lamp, in combination, electrodes adapted to be spaced to establish an arc, electrically-energizable reversible motive means, motion transmitting means associated with the electrically-energizable motive means for simultaneously moving said electrodes upon energization of the motive means, circuit means for supplying current to the electrically-energizable motive means and the electrodes, relay means including a current coil and a voltage coil intercalated in said circuit means to effect energization of said electrically-energizable motive means, and biasing means associated with said relay means and said electrically-energizable motive means for controlling the direction of movement of said motive means to establish an arc of substantially constant intensity during current flow through the electrodes.

References Cited in the file of this patent

UNITED STATES PATENTS

| | | |
|---|---|---|
| 1,241,574 | Sykes | Oct. 2, 1919 |
| 1,347,838 | Bulley | July 27, 1920 |
| 1,447,236 | Chaney | Mar. 6, 1923 |
| 1,449,578 | Boddie | Mar. 27, 1923 |
| 1,495,421 | Marshick | May 27, 1924 |
| 2,454,207 | Reilly | Nov. 16, 1948 |